(12) United States Patent
Tilley

(10) Patent No.: US 9,371,940 B2
(45) Date of Patent: Jun. 21, 2016

(54) ADJUSTABLE HOSE HOLDING DEVICE AND METHOD THEREFOR

(71) Applicant: Michael Tilley, Phoenix, AZ (US)

(72) Inventor: Michael Tilley, Phoenix, AZ (US)

( * ) Notice: Subject to any disclaimer, the term of this patent is extended or adjusted under 35 U.S.C. 154(b) by 0 days.

(21) Appl. No.: 14/525,942

(22) Filed: Oct. 28, 2014

(65) Prior Publication Data

US 2016/0116082 A1    Apr. 28, 2016

(51) Int. Cl.
| F16L 3/00 | (2006.01) |
| F16M 11/28 | (2006.01) |
| F16M 11/10 | (2006.01) |
| F16M 11/16 | (2006.01) |
| F16M 11/24 | (2006.01) |

(52) U.S. Cl.
CPC .............. *F16L 3/003* (2013.01); *F16M 11/105* (2013.01); *F16M 11/16* (2013.01); *F16M 11/24* (2013.01); *F16M 11/28* (2013.01)

(58) Field of Classification Search
USPC ......... 248/75, 80, 89, 121, 125.8, 125.9, 161, 248/177.1, 178.1, 534, 535, 539; 43/21.2
See application file for complete search history.

(56) References Cited

U.S. PATENT DOCUMENTS

| 996,464 | A | | 6/1911 | Darst et al. |
| 1,065,202 | A | | 6/1913 | Bailey |
| 1,080,770 | A | | 12/1913 | Matthews |
| 1,337,541 | A | | 4/1920 | Burnwatt et al. |
| 1,704,363 | A | | 3/1929 | Jones |
| 2,255,630 | A | * | 9/1941 | Sass ........................ F16M 11/00 248/124.2 |
| 2,439,642 | A | | 4/1948 | White |
| 2,544,986 | A | | 3/1951 | Dyer et al. |
| 2,942,822 | A | | 6/1960 | Crow |
| 2,993,671 | A | | 7/1961 | Knebusch |
| 3,941,342 | A | | 3/1976 | Bradshaw |
| 5,058,308 | A | * | 10/1991 | Girard .................. A01K 97/125 43/17 |
| 5,666,940 | A | * | 9/1997 | Kreiter .................... F24B 1/205 126/25 A |
| 6,341,443 | B1 | * | 1/2002 | Watford ................. A01K 97/10 43/17 |
| 7,043,869 | B1 | * | 5/2006 | Hubbard ................ A01K 97/10 43/21.2 |
| 2004/0079849 | A1 | * | 4/2004 | Rudolf ................ F16C 11/0619 248/276.1 |
| 2005/0184203 | A1 | | 8/2005 | Votypka |

* cited by examiner

*Primary Examiner* — Steven Marsh
(74) *Attorney, Agent, or Firm* — Weiss & Moy, P.C.; Jeffrey D. Moy

(57) ABSTRACT

A spray nozzle holder has a pole member. A head device is removably attached to a top end of the pole member. The head member has a holding unit. A support rod extends from the holding unit. A mounting rod is removably attached to the top end of the pole member. The support rod is positioned through the mounting rod. A securing device is used for securing the holding unit at different angles.

16 Claims, 6 Drawing Sheets

ADJUSTABLE HOSE HOLDING DEVICE AND METHOD THEREFOR

TECHNICAL FIELD

The present application generally relates to a garden hose, and, more particularly, to an adjustable holding device for a hose and spray nozzle.

BACKGROUND

Flexible hoses with spray nozzles (hereinafter hose and nozzle) are commonly used for watering yards, washing vehicles, and other outdoor activities. One issue with using the hose and nozzle is that the user generally has to use one hand to hold and/or adjust the nozzle and another hand to move the hose. Thus, in certain situations, such as when a user's hands are holding other objects, it may be difficult for the user to hold and use the hose and nozzle.

For example, when a person has to wash a vehicle, the person generally has to pick-up a sponge to wash the car, place the sponge down, and then pick-up the hose and nozzle to rinse off the vehicle. In another example, when a person is washing his/her hands outdoors with the hose and nozzle, the user generally has to pick-up and adjust the hose and nozzle to wet the user's hands, place the hose and nozzle onto the ground, the user's hands then scrubs his/her hands with soap, and then pick-ups the hose and nozzle with soapy hands in order to rinse the soap off the user's hands.

Thus, it would be desirable to provide an adjustable device for holding a hose and nozzle.

SUMMARY

In accordance with one embodiment, A spray nozzle holder has a pole member. A head device is removably attached to a top end of the pole member. The head member has a holding unit. A support rod extends from the holding unit. A mounting rod is removably attached to the top end of the pole member. The support rod is positioned through the mounting rod. A securing device is used for securing the holding unit at different angles.

In accordance with one embodiment, a spray nozzle holder has a telescopic pole member. A head device is removably attached to a top end of the pole member. The head device holds the spray nozzle at a plurality of angles.

In accordance with one embodiment, a spray nozzle holder has a stand. A pole member has a bottom end removably attached to the stand. A head device is removably attached to a top end of the pole member. The head member has a holding unit. A support rod extends from the holding unit. A mounting rod is removably attached to the top end of the pole member. The support rod is positioned through the mounting rod. A securing device is provided for securing the holding unit at different angles.

BRIEF DESCRIPTION OF DRAWINGS

Embodiments of the disclosure will become more fully understood from the detailed description and the accompanying drawings, wherein.

DESCRIPTION OF THE APPLICATION

Figure 1:
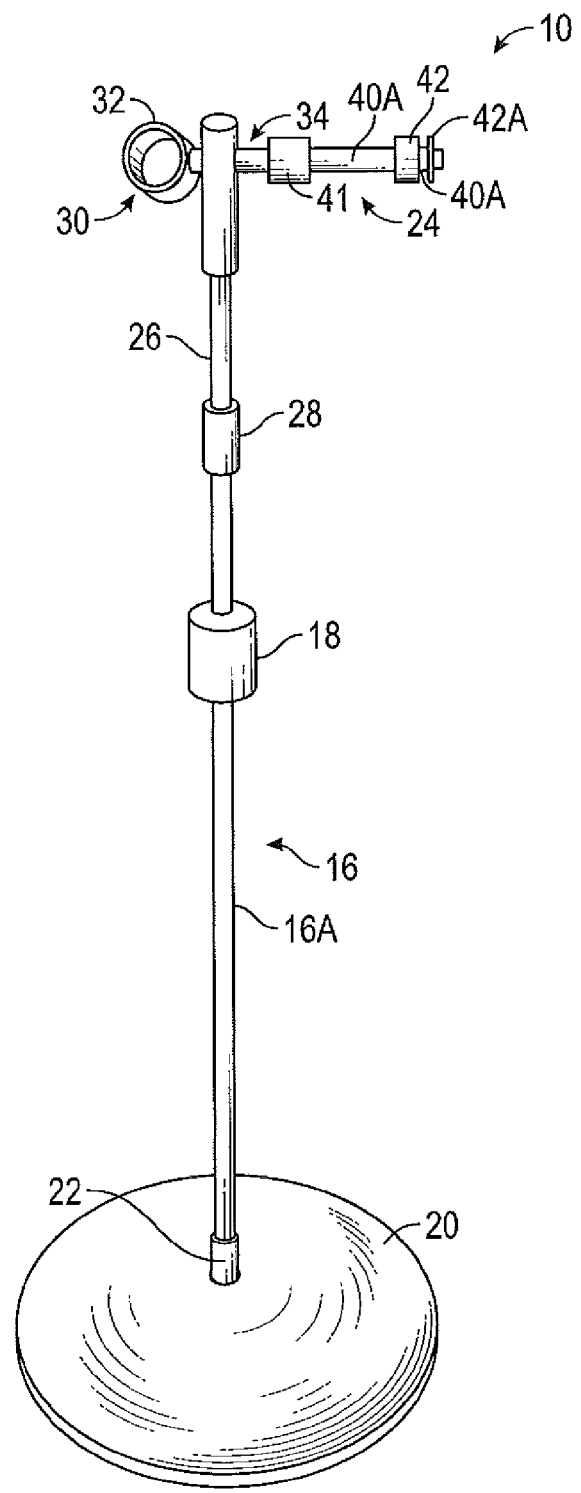
FIG. 1 is a perspective view of an exemplary hose and nozzle holding system in accordance with one aspect of the present application.
Figure 2:
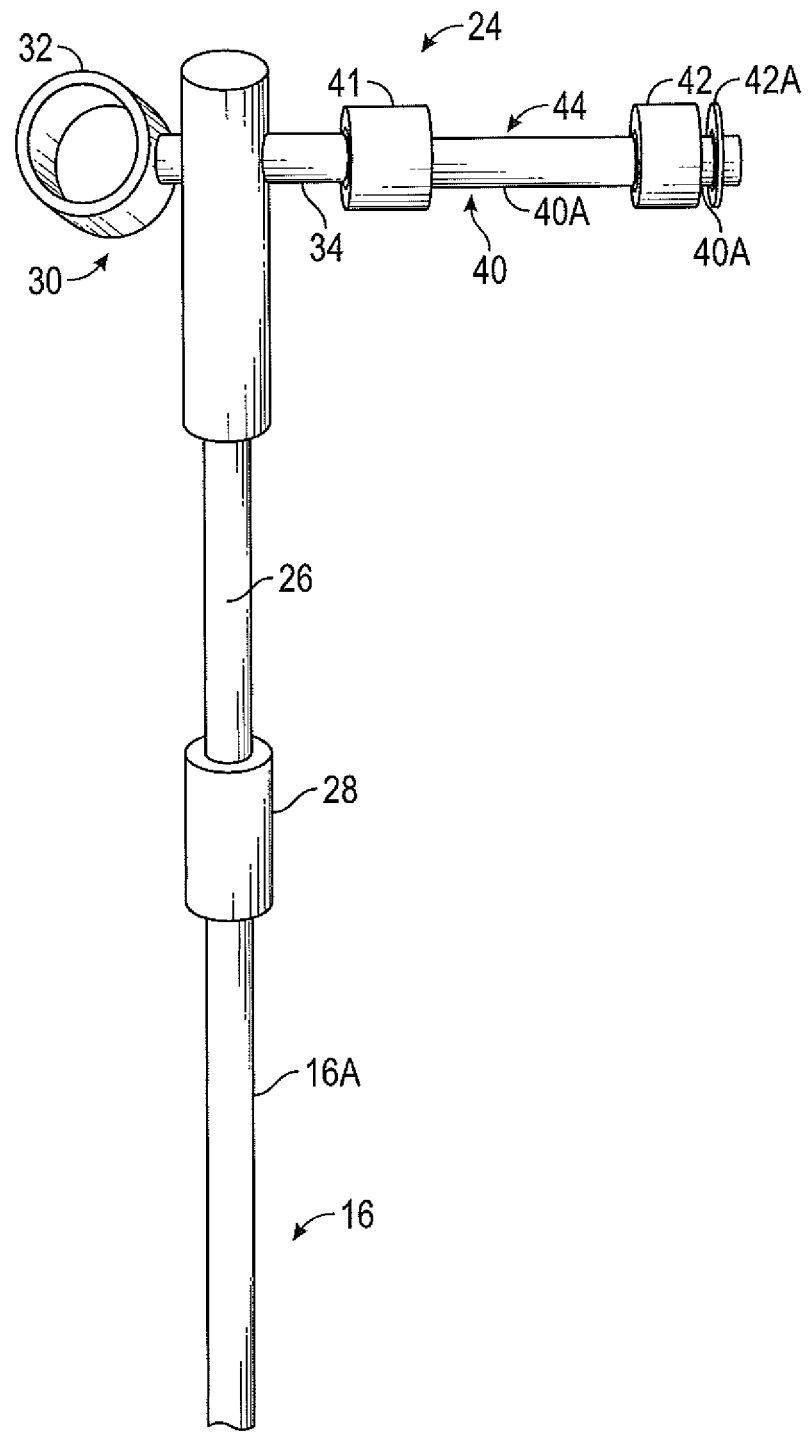
FIG. 2 is a magnified view of hose and nozzle holding system depicted in FIG. 1 in accordance with one aspect of the present application.
Figure 3:
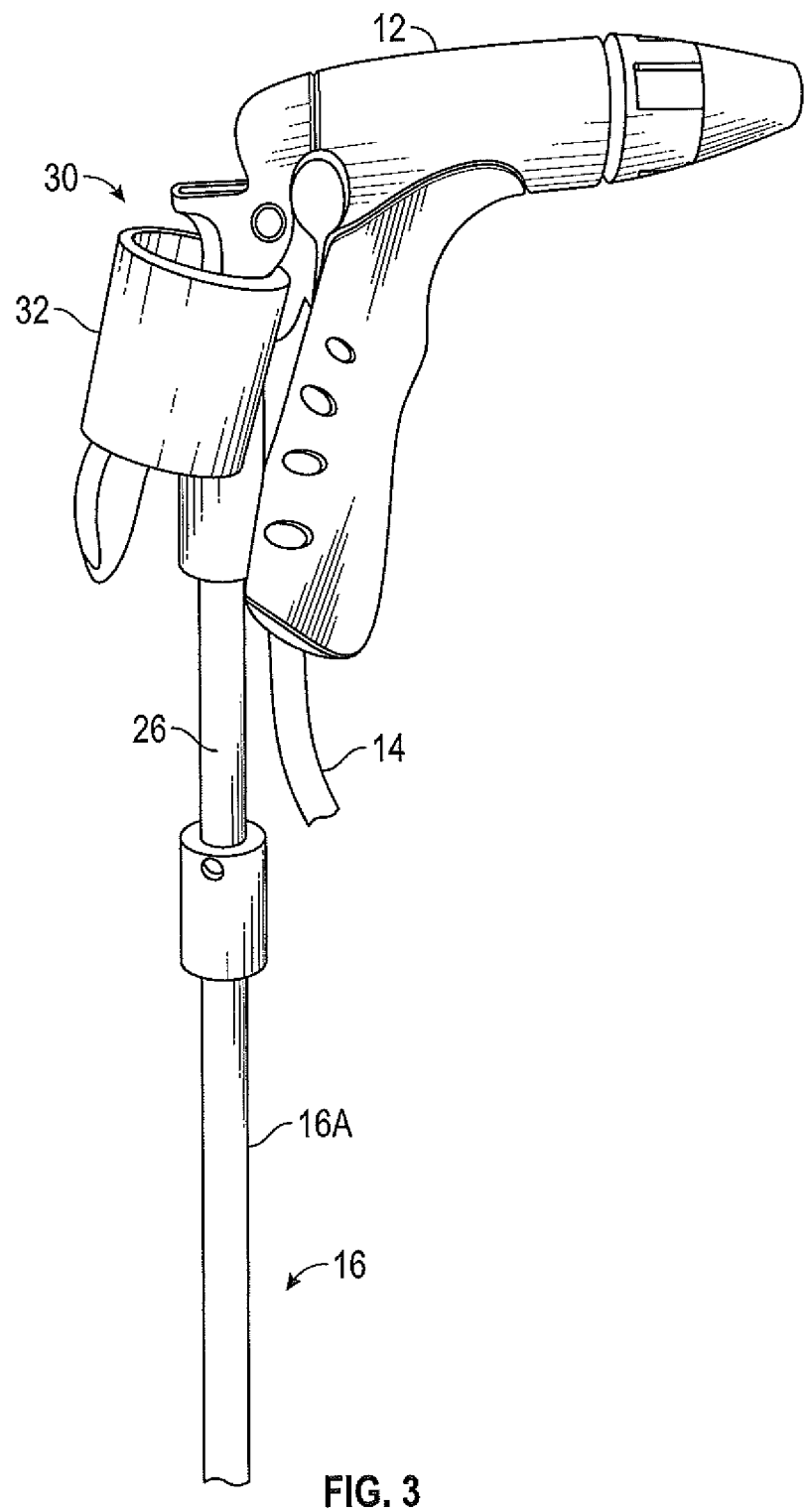
FIG. 3 is a magnified view of hose and nozzle holding system depicted in FIG. 2 holding a spray nozzle in accordance with one aspect of the present application.
Figure 4:
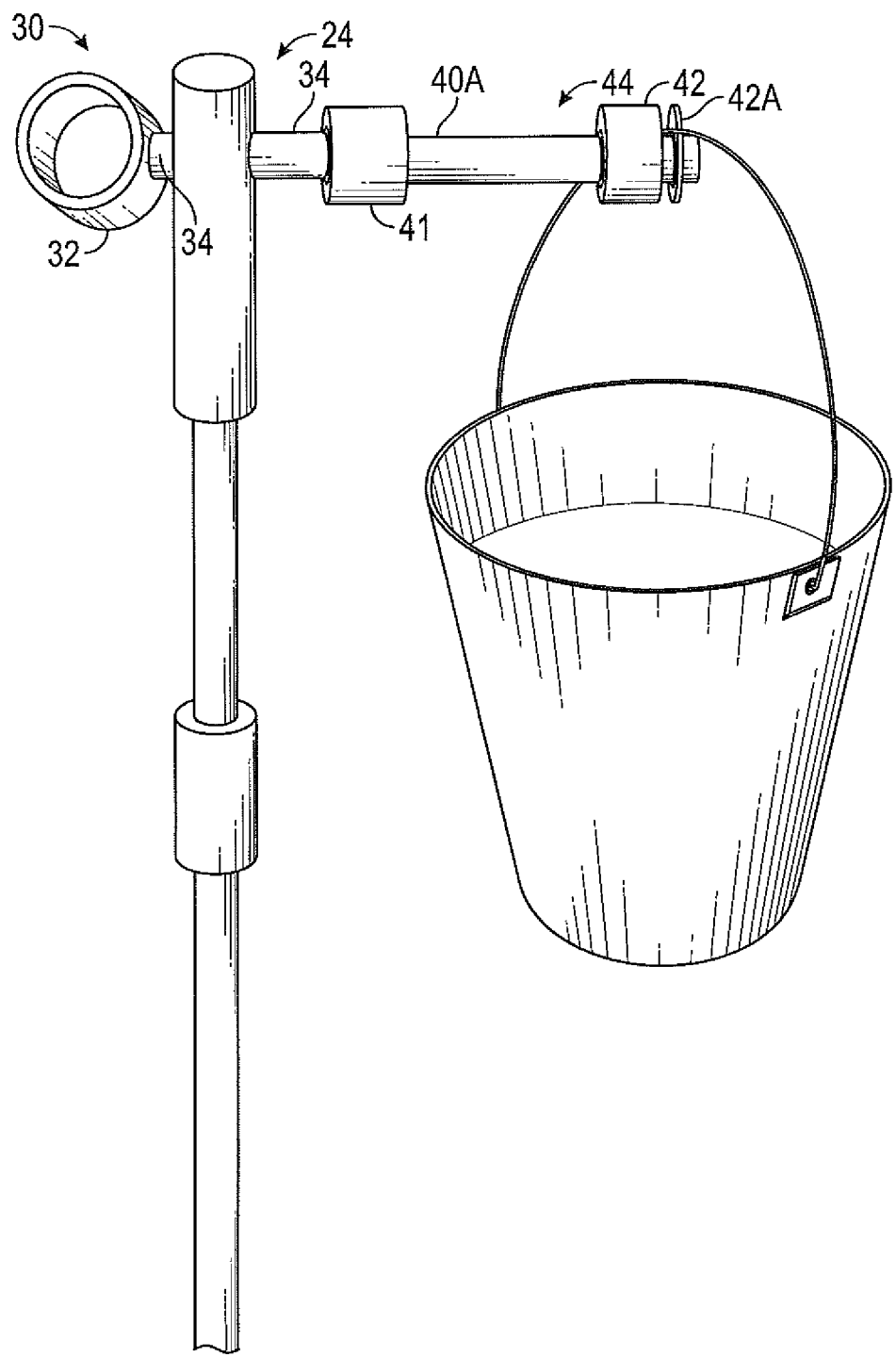
FIG. 4 is a magnified view of hose and nozzle holding system depicted in FIG. 2 holding a bucket/accessory in accordance with one aspect of the present application.
Figure 5:
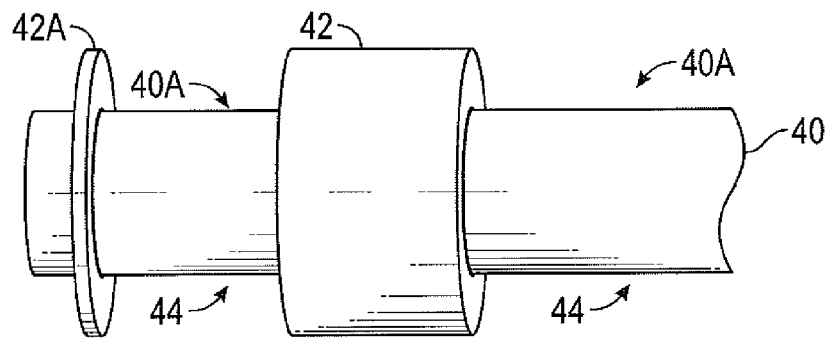
FIG. 5 is another magnified view of hose and nozzle holding system depicted in FIG. 1.
Figure 6:
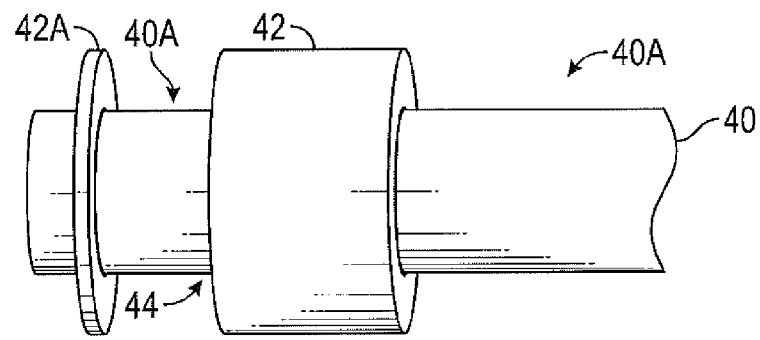
FIG. 6 is another magnified view of hose and nozzle holding system depicted in FIG. 1.
Figure 7:
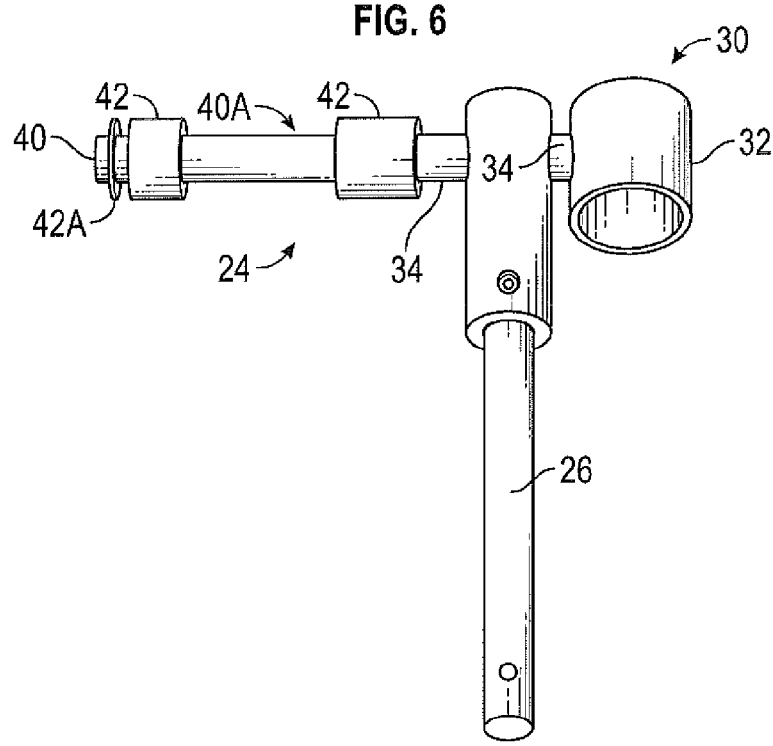
FIG. 7 is perspective view of the head device of the hose and nozzle holding system depicted in FIG. 1.
Figure 8:
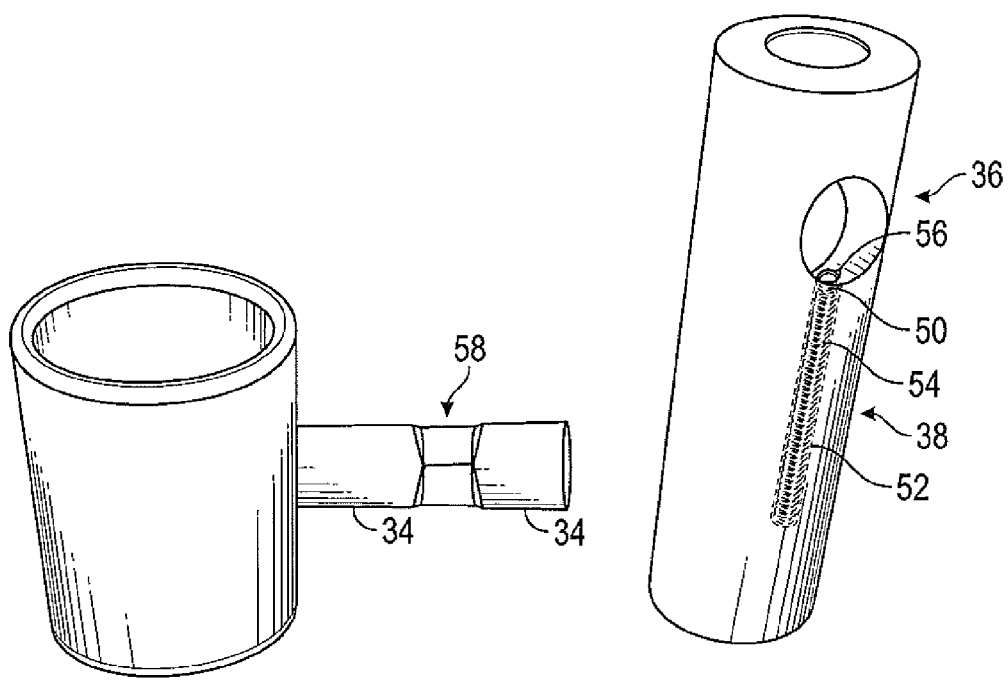
FIG. 8 is a magnetized view of the ball detent mechanism used in the hose and nozzle holding system depicted in FIG. 1.

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Referring to the FIGS., an adjustable hose and nozzle holding device 10 (hereinafter device 10) may be seen. The device 10 may be used to hold a nozzle 12 and/or hose 14. The device 10 is adjustable. The device 10 may be used to allow the nozzle to be placed at different heights and/or angles thereby adjusting the spray direction and location of the nozzle 12.

The device 10 may have a pole member 16. The poke member 16 may be used to support the nozzle 12 and/or hose 14 in an upright position. The pole member 16 may be adjustable in height. In accordance with one embodiment, the pole member 16 may be a telescopic pole member 16A. The telescopic pole member 16A may have a locking mechanism 18 to hold the telescopic pole member 16A at different height levels.

A stand 20 may be attached to one end of the pole member 16/16A. The stand 20 may be used to hold and support the pole member 16/16A in an upright manner. The stand 20 may be formed of different geometric shapes. While the stand 20 is shown as circular in the FIGS., this is shown as an example and should not be seen in a limiting manner. The stand 20 may be slightly weighted. This may prevent the device 10 from tipping over.

In accordance with one embodiment, the stand 20 may be removably attached to the pole member 16/16A. A locking device 22 may be used to removably attach the pole member 16/16A to the stand 20. The locking device 22 may be a thumb screw locking device or the like. The above is given as an example and should not be seen in a limiting manner. By removing the stand 20, the pole member 16/16A may be inserted directly into the ground such as a yard or the like.

A head device 24 may be coupled to a top section of the pole member 16/16A. The head device 24 may be used to hold the nozzle 12. The head device 24 may be adjustable. Thus, the head device 24 may be used to adjust an angle of the nozzle device 12 positioned in the head device 24.

The head device 24 may have a mounting rod 26. The mounting rod 26 may be used to removably secure the head device 24 to the top section of the pole member 16/16A.

When the head device 24 is removed from the top section of the pole member 16/16A, the head device 24 may be directly inserted into the ground (i.e., yard, etc). A locking device 28 may be used to removably secure the head device 24 to the top section of the pole member 16/16A. The locking device 28 may be a locking screw or the like. The above is given as an example and should not be seen in a limiting manner.

The head device 24 may have a holding unit 30. The holding unit 30 may be used to position and hold the nozzle 12. In accordance with on embodiment, the holding unit 30 has a tubular member 32. The tubular member 32 may be used to hold the nozzle 12. The nozzle 12 may be positioned in or hung from the tubular member 32.

A support rod 34 may be coupled to and extend from the tubular member 32. The support rod 34 may be used to secure the holding unit 30 to the mounting rod 26. A securing device 36 may be used to secure the holding unit 30 at different angles within the support rod 34. In accordance with one embodiment, the securing device 36 may be a ball detent mechanism 38. The ball detent mechanism 38 may have base unit 49. A ball bearing may be positioned within a channel 52 formed in the base unit. A spring 54 may push the ball bearing 50 through an opening 56. When the support rod 34 is inserted into the securing device 36, the ball bearing 50 may be in communication with an indentation 58 formed in the support rod 34. Rotating the support rod 34 may allow the ball bearing 50 to engage different indentations 58 thereby securing the holding unit 30 at different angles within the support rod 34. It should be noted that a lubricant or similar item may be placed within the base unit 49 to lessen friction within the ball detent mechanism 38.

A holding rod 40 may extend from the securing device 36. The holding rod 40 may be used to hold different objects when using the device 10. In accordance with one embodiment, an attachment device 41 may be used to couple the holding rod 40 to the support rod 34.

The holding rod 40 may have one or more holding areas 40A. The holding areas 40A may be used to place and hold different objects that may be needed when using the device 10. The holding areas 40A may be formed by having end members 42 formed around the holding rod 40. The end members 42 may be larger in diameter than the holding rod 40 thereby forming a valley 44 between the end members 42 and the support rod 34. The valley 44 may be used to hold the above mentioned objects.

In accordance with one embodiment, one end member 42A is adjustable. The end member 42A may be rotated inwards or outwards to decrease or increase the space of the holding area 40A.

While embodiments of the disclosure have been described in terms of various specific embodiments, those skilled in the art will recognize that the embodiments of the disclosure may be practiced with modifications within the spirit and scope of the claims.

What is claimed is:

1. A spray nozzle holder comprising:
   a pole member;
   a head device removably attached to a top end of the pole member, wherein the head device comprises:
   a holding unit;
   a support rod extending from the holding unit;
   a mounting rod removably attached to the top end of the pole member, the support rod positioned through the mounting rod; and
   a securing device for securing the holding unit at different angles, wherein the securing device is a ball detent mechanism.

2. The spray nozzle holder of claim 1, further comprising a stand removably attached to a bottom end of the pole member.

3. The spray nozzle holder of claim 1, further a holding rod extending from the securing device and having at least one holding area.

4. The spray nozzle holder of claim 3, further comprising a plurality of end members positioned on the holding rod forming the at least one holding area.

5. The spray nozzle holder of claim 1, wherein the pole member is a telescopic pole member.

6. The spray nozzle holder of claim 1, wherein the holding unit is a tubular member.

7. A spray nozzle holder comprising:
   a telescopic pole member; and
   a head device removably attached to a top end of the pole member, wherein the head device holds the spray nozzle at a plurality of angles, wherein the head device comprises:
   a tubular holding unit;
   a support rod extending from the holding unit;
   a mounting rod removably attached to the top end of the pole member, the support rod positioned through the mounting rod;
   a securing device for securing the holding unit at different angles, wherein the securing device is a ball detent mechanism; and
   a holding rod extending from the securing device.

8. The spray nozzle holder of claim 7, further comprising a stand removably attached to a bottom end of the pole member.

9. The spray nozzle holder of claim 8, further comprising holding areas formed on the holding rod.

10. The spray nozzle holder of claim 8, further comprising a plurality of end members positioned on the support rod forming the holding areas.

11. A spray nozzle holder comprising:
    a stand;
    a pole member having a bottom end removably attached to the stand;
    a head device removably attached to a top end of the pole member, wherein the head device comprises:
    a holding unit;
    a support rod extending from the holding unit;
    a mounting rod removably attached to the top end of the pole member, the support rod positioned through the mounting rod; and
    a securing device for securing the holding unit at different angles, wherein the securing device is a ball detent mechanism.

12. The spray nozzle holder of claim 11, further comprising holding rod extending from the securing device.

13. The spray nozzle holder of claim 12, further comprising a plurality of end members positioned on the holding rod forming holding areas.

14. The spray nozzle holder of claim 11, wherein the pole member is a telescopic pole member.

15. The spray nozzle holder of claim 14, wherein the holding unit is a tubular member.

16. The spray nozzle holder of claim 11, wherein the ball detent mechanism comprises:
    a plurality of indentations formed around the support rod; and
    a ball device positioned within the mounting rod and engaging the support rod.

* * * * *